United States Patent [19]

Ide

[11] 4,046,266
[45] Sept. 6, 1977

[54] RETRACTABLE CARGO TRANSFER APPARATUS

[76] Inventor: Allan R. Ide, 10066 Bloomfield, Cypress, Calif. 90630

[21] Appl. No.: 697,219

[22] Filed: June 17, 1976

[51] Int. Cl.² .............................................. B65G 63/00
[52] U.S. Cl. ..................................... 214/14; 198/607; 214/89
[58] Field of Search ............................ 214/14, 12, 89; 198/347, 607; 187/9 E, 95

[56] References Cited

U.S. PATENT DOCUMENTS

| 2,876,919 | 10/1959 | True | 214/14 |
| 3,841,442 | 10/1974 | Erickson | 187/9 E |

*Primary Examiner*—Robert J. Spar
*Assistant Examiner*—George F. Abraham

*Attorney, Agent, or Firm*—Fulwider, Patton, Rieber, Lee & Utecht

[57] ABSTRACT

An improved cargo transport system for transferring discrete cargo loads from a cargo terminal to a vessel laterally displaced from and below the cargo terminal. The improvement includes a horizontally laterally extending powered conveyor system having an elevator mechanism. The elevator mechanism includes telescoping elements extending downwardly from one end thereof to raise and lower a depending elevator platform. The platform is movable in a vertical direction with respect to the lowermost telescoping element, which in turn is movable with respect to the uppermost telescoping element. The powered conveyor system is mounted on a support which is hinged at an end adjacent to the cargo terminal.

9 Claims, 4 Drawing Figures

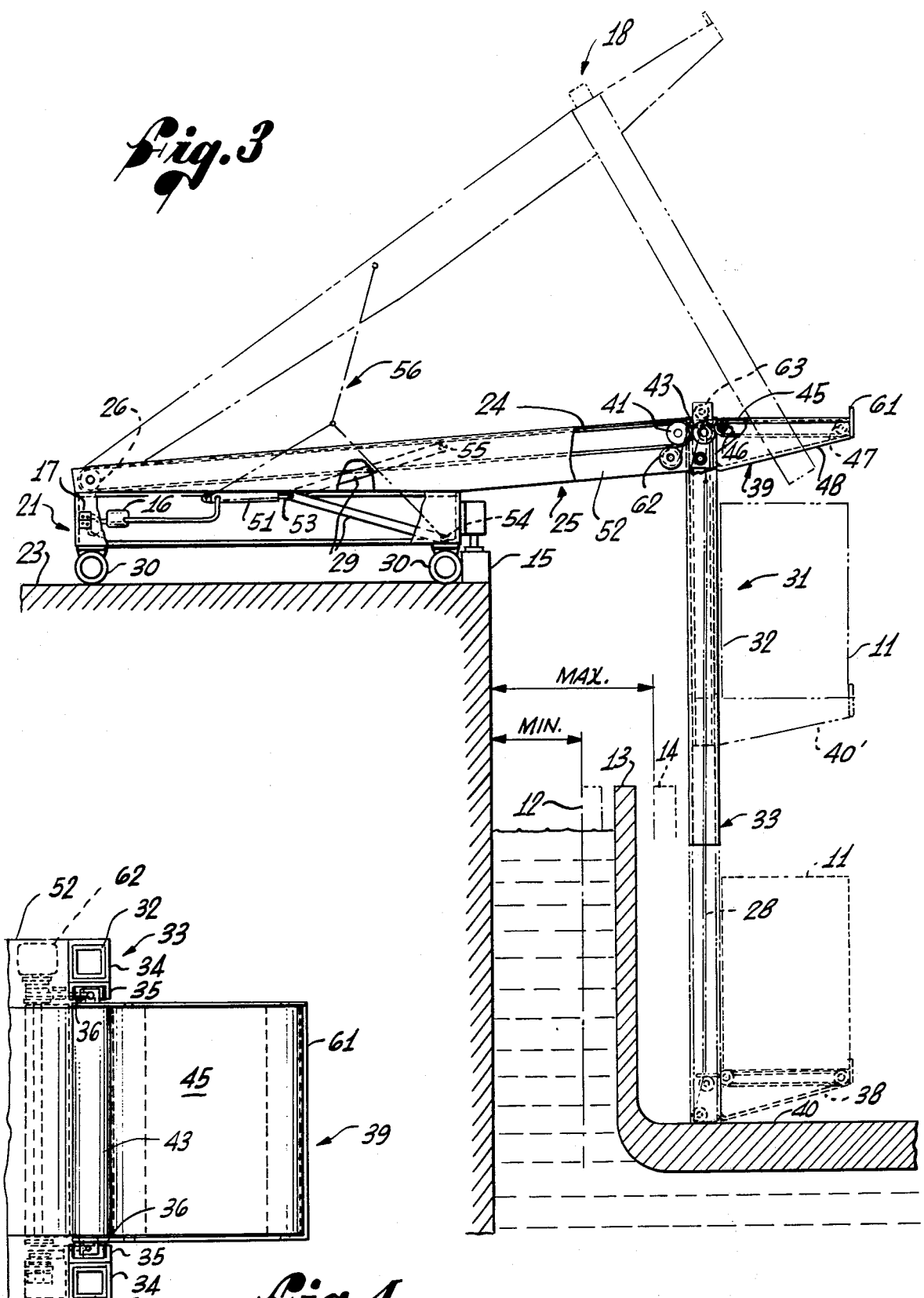

RETRACTABLE CARGO TRANSFER APPARATUS

FIELD OF THE INVENTION

The present invention relates to devices for loading discrete cargo loads onto a vessel which is laterally displaced from and below the level of a cargo terminal. Individual cargo loads are carried sequentially from the loading terminal to the vessel by means of the cargo transport system.

BACKGROUND OF THE INVENTION

In the past, various mechanisms have been employed to effect the transfer of discrete cargo loads from a cargo terminal to a vessel that is laterally displaced from the cargo terminal and located below the level of it. Many of these prior systems require portions of the loading equipment to be secured to or positioned upon the vessel. This has a disadvantage, however, when dealing with vessels such as barges. When discrete cargo loads are to be carried by barges, it is usually inconvenient for any portion of the loading mechanism to be positioned upon or attached to the barge. Portions of such loading mechanisms which are positioned upon the barge occupy valuable space into which goods could otherwise be loaded. Portions of cargo transport systems attached to barges also require the provision of a flexible connection to the cargo terminal, since even in the calmest waters a vessel will shift at its moorings to a certain extent.

Some cargo transport systems involve the use of conveyor systems having flexible pockets. In these systems, endless chains travelling within guides carry an endless fabric belt. The fabric belt has a great deal of slack so that pockets are formed in the belt as it hangs in loose loops between points of attachment to the chains. Such systems either occupy deck space on the vessel to be loaded or are so cumbersome that extensive time is required to maneuver them into position adjacent to the vessel to be loaded.

SUMMARY OF THE INVENTION

The present invention seeks to remedy these and other deficiencies to the prior cargo loading systems heretofor available. Accordingly, it is an object of the present invention to provide a cargo transport system which carries cargo in both lateral and vertical directions in discrete, unitized loads from a cargo terminal for loading onto a vessel.

It is a further object of the invention to provide a cargo transfer system mounted entirely at the cargo terminal and which does not occupy cargo deck space or storage space on the vessel and which does not move with the shifting and roll of the vessel.

A further object of the invention is to provide a cargo transfer system in which a lateral conveyor transports cargo loads to an elevator, which in turn lowers the cargo loads into a vessel to be loaded. A related object is to provide such a cargo transfer system in which the elevator mechanism may be extended down into the vessel so as to carry the cargo loads as close as possible to the locations in which they will be stored, yet which is withdrawn for each cargo load into a position adjacent to a laterally extending conveyor system mounted at the cargo terminal so as to facilitate removal of the cargo from the cargo terminal onto the vessel. This is achieved by providing the elevator mechanism with telescoping elements that form guideways for a vertically movable platform member. Removal of the load transfer system from the vicinity of the vessel is further aided by securing a support for a powered cargo conveyor system at one end to the loading terminal while locating an elevator mechanism at the other end of the conveyor system. The entire conveyor system may be rotated up and out of the way to accomodate the approach of a vessel. Once the vessel is in position, the cargo loading system may be returned so that the elevator mechanism may be lowered into the hold of the vessel.

BRIEF DESCRIPTION OF THE DRAWINGS

FIG. 3 is a sectional view of an embodiment of the cargo transfer system of the invention;

FIG. 4 is an enlarged plan view of a portion of the powered lateral conveyor and the cargo receptacle of the invention in its upper position.

DETAILED DESCRIPTION OF THE PREFERRED EMBODIMENT

Figure 1:
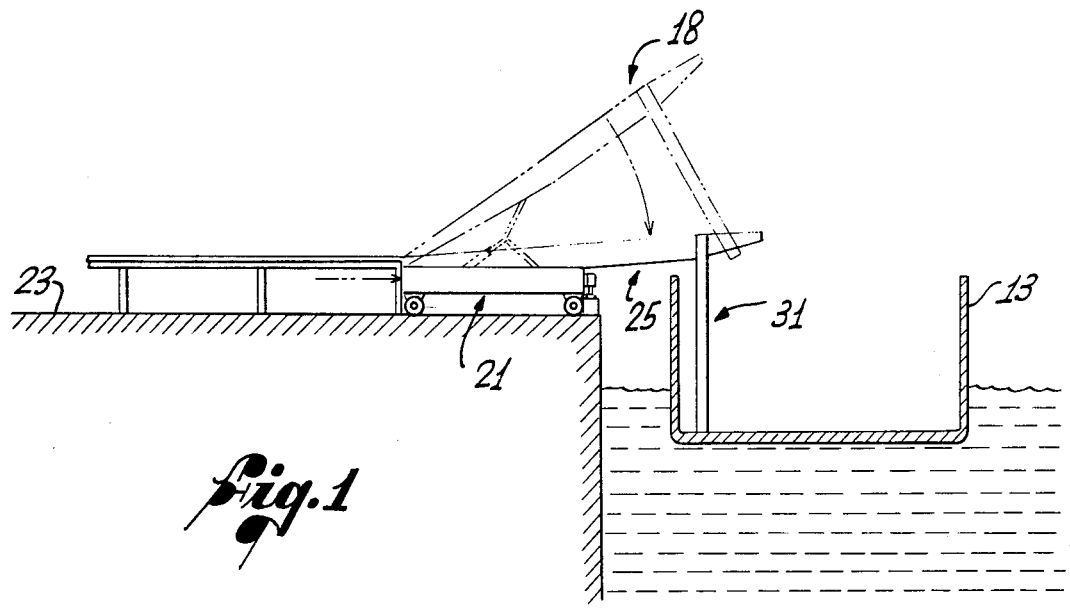
FIG. 1 illustrates the cargo transfer mechanism in position for loading cargo onto a barge.
Figure 2:
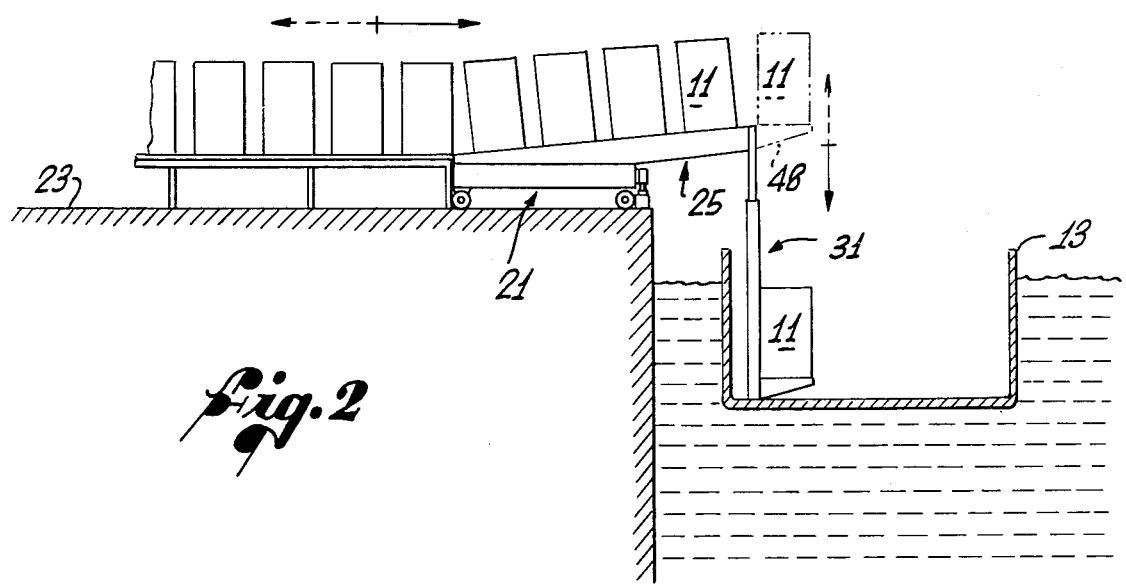
FIG. 2 illustrates the operation of the invention in loading a barge.

Referring to FIGS. 1 and 2, in a broad aspect the present invention is an improved cargo transport system for transferring discrete cargo loads 11 from a cargo terminal to a vessel 13 displaced laterally and vertically downward from the cargo terminal 23. Referring to FIG. 3 an endless horizontally extending conveyor 25 is carried on frame support 52 that is rotatably mounted at one end on a truck, generally designated 21. Such a frame has a free end for extension beyond the edge of the cargo terminal 23 and into vertical alignment over the vessel 13. An elevator generally designated 31, depends from the free end of the freight support and includes guideways 35 formed of vertically extending telescoping tubes 32 and 33. A horizontal cargo receptacle 39 positioned for vertical movement along the guideways 35 is provided for movement between a lowered position 38 and an upper position 40 which is in lateral alignment with the powered endless conveyor 25 at the free end of the support. A winch mechanism 62 mounted on top of the elevator 31 raises and lowers the cargo receptacle 39 longitudinally along the guideways.

Referring to FIG. 1 a barge 13 to be loaded is brought into position as close as practical adjacent to a loading dock acting as the terminal 23 and is moored. As illustrated, the barge 13 is laterally displaced from and located below the level of the loading dock 23.

Referring to FIG. 3, the conveyor support frame 52 includes a pair of laterally extending side rails with transverse connecting members at spaced intervals. An endless conveyor belt 24 is mounted upon the support frame 52 and is supported therealong by a number of rollers transversely mounted with respect to the side rails within the loop formed by the conveyor 24. All of these rollers have been omitted from the drawings for the sake of clarity with the exception of the end rollers 26 and 41. These rollers lie at the extremities of the loop formed by the conveyor belt 24.

Still referring to FIG. 3, the carriage 21 may be secured in position with respect to the dock 23 and is restrained from rolling off the dock by a horizontally extending retaining rail 15. The support frame 52 of the cargo transport system 25 is rotatably mounted at one end on the carriage 21 and in the preferred embodiment its axis of rotation coincides with the axis of the roller 26, as illustrated in FIG. 3. The carriage 21 may be rolled into position on its wheels 30 so that it is positioned adjacent to the retaining rail 15. The carriage 21 may then be restrained from all further movement through the use of leveling and load bearing jacks, wheel locks or other immobilizing means (not illustrated). When the carriage 21 is in this position, it can be seen that the support 52 of the powered endless conveyor means 25 is rotatably mounted at one end about an axis secured in position with respect to the loading dock 23. The free end of the support 52 extends over the edge of the cargo terminal into vertical alignment with the vessel 13.

Referring to FIG. 3, a horizontally projecting hydraulic actuator is interposed between the carriage 21 and the support frame 52 and is rotatably attached on its blind end to the carriage 21, and has its piston rod 53 rotatably connected to links 29. The remote end of the lower link 29 is connected to the carriage 21 by a pivot pin 54 and the remote end of the upper link 29 is connected to the support frame 52. The two links 29 thereby form a scissors configuration for raising the carriage 21 at pivot pins 55. The remote extremity of the upper link 29 may be bifurcated to form a yoke, the arms of which pass on opposite sides of the conveyor 21 and are attached to the side rails of the support frame 52 so as not to interfere with the operation of the conveyor belt 24.

With particular reference to FIG. 3, it can be seen that the elevator mechanism 31 depends from the free end of the support 52. The elevator mechanism 31 is provided with upper telescoping elements 32 which are rigidly secured to the framework 52 and extend substantially perpendicular therefrom. The upper elements 32 are mounted on either side of the support 52, as indicated in FIG. 4. The upper elements 32 are of angular cross section and telescope into corresponding receptacle portions 34 of the lower elements 33. The lower elements 33 additionally include inwardly facing channels 35 which form longitudinally extending dual parallel guideways. These guideways are oriented in a generally vertical direction when the powered endless conveyor system 25 is in the position indicated in solid lines in the drawings.

A cargo receptacle 39 is positioned for longitudinal movement along the guideways formed by the channels 35 between a lowered position indicated in dotted lines at 38 and through intermediate positions, as at 40, to an upper position 48. The upper position 48 is in lateral alignment with the powered endless conveyor means 25 at the free end of the support 52.

The cargo receptacle 39 includes a shelf extending laterally out from the lower elements 33. Rollers 36 are attached to the shelf and ride within the guideways formed by the channels 35. The shelf is comprised of a framework carrying a laterally extending receptacle conveyor 45. The conveyor 45, like the conveyor 24 is also an endless conveyor. The receptacle conveyor 45 forms a loop about the rollers 46 and 47 which are rotatable within the confines of the cargo receptacle 39.

A motor and gear box assembly 59 is carried on the support 52, and powers the endless conveyor system 25 through the driving roller 41. The driving roller 41, although associated with the conveyor system 25, also engages an idler roller 43. This idler roller 43 in turn frictionally engages the roller 46 to drive the conveyor belt 45 in the same direction as the conveyor belt 24 when the cargo receptacle 39 is in its upper position at 48. All points of engagement between the rollers 41, 43 and 46 are laterally displaced from the conveyor belts 24 and 45, so that there is no interference in the operation of those conveyor belts. Operation of the conveyor belts 24 and 45 while the cargo receptacle 39 is in the position indicated at 48 allows a cargo load 11 to be propelled by the conveyor system 25 onto the cargo receptacle 39. The conveyor belt 45 assists in carrying the cargo load 11 onto the cargo receptacle 39, and to the lateral extremity of the shelf thereof. The cargo receptacle 39 is provided with a limit stop 61 fixed into position at the lateral extremity thereof to prevent the cargo loads 11 from advancing beyond the lateral extremity of the cargo receptacle 39.

A winch 62 is mounted on the framework 52 and carries a cable 28 which passes over a pulley 63 and extends down the length of the elevator 31 and is secured to the cargo receptacle 39 to raise and lower the cargo receptacle 39 longitudinally along the guideways formed by the channels 35. Through a pulley mechanism, the cable 28 from the winch 62 is also operably connected to one of the lower telescoping elements 33. In this way, operation of the winch mechanism moves the cargo receptacle 39 longitudinally along the lower telescoping elements 33, and also moves the lower telescoping elements 33 relative to the upper telescoping elements 32. The pulley system around which cable 28 passes is selected so that winding the winch cable 28 raises the cargo receptacle 39 to the upper extremity of the lower elements 33 at approximately the same time that the lower elements 33 substantially fully envelop the upper elements 32. The elevator mechanism 31 is therefore fully retracted when the receptacle conveyor is moved to its upper position 48 in lateral alignment with the powered endless conveyor means 25.

When moved to its upper position, the cargo receptacle 39 is brought to a position in which the idler roller 43 is frictionally engaged with the roller 46 driving the belt 45. When the cargo receptacle 39 leaves the upper position, the roller 43 disengages from the roller 46 and the belt 45 is no longer driven. This prevents a cargo load 11 from being continually forced against the limit stop 61 except when the cargo receptacle 39 is in its extreme upper position at 48.

In the operation of the device of this invention, carriage 21 is brought into the position indicated in FIG. 1. The support 52 is rotated upward. Thus, operation of the hydraulic control 17 can actuate the pump 16 to force the piston rod 53 and links 29 from the positions indicated in solid lines in FIG. 3 to the general configuration 56 shown in dotted lines. This forces the powered endless conveyor means 25 from the position indicated in solid lines in FIGS. 1 and 3 to that indicated in dotted lines at 18. The framework of the conveyor system 25 is thus hydraulically assisted in its upward counterclockwise rotation with respect to the loading dock 23. Rotation of the conveyor system to the position at 18 allows a vessel 13 to move into the loading position indicated in the drawings without interference from the cargo transport system of this invention. Once the vessel 13 is moved in position adjacent to the dock 23 the conveyor system 25 is lowered to the position indicated in solid lines in the drawings. The support frame 52 is lowered in this manner so that the elevator 31 depends into the barge 13 as indicated in solid lines in FIG. 1. The powered cargo delivery means 25 is actuated so that discrete loads 11 are sequentially delivered to the elevator 31. At the elevator 31, they are sequentially carried onto the belt 45. The winch 62 is actuated to unwind the cable 28 and lower the cargo receptacle 39 and extend the lower telescoping elements 33 from the upper elements 32. A cargo load 11 is thereby delivered to the hold of the barge 13 as indicated in FIG. 2. The winch 62 is reversed so that the cargo receptacle 39 is raised to the upper position 48 in FIG. 2 to receive the next sequential load 11 thereon. The process is repeated for each cargo load 11 to be stored in the barge 13.

The foregoing description of one embodiment of the invention should be considered illustrative only of the various forms and modifications of the present invention which will become readily apparent to those familiar with cargo loading. Accordingly, the scope of the invention should not be construed as limited to that embodiment depicted in the drawings, but rather is defined by the claims appended hereto.

I claim:

1. In a cargo transport system for transferring discrete cargo loads from a cargo terminal into a vessel displaced laterally therefrom and located below the level thereof, the improvement comprising:

a powered endless conveyor means carried on a support rotatably mounted at an end and secured with respect to said cargo terminal and having a free end for extension beyond said cargo terminal into vertical alignment with said vessel;

an elevator mechanism depending from the free end of said support and having guideways formed of longitudinally extending telescoping elements and having a cargo receptacle positioned for longitudinal movement along said guideways between a lowered position and an upper position in lateral alignment with said powered endless conveyor means at said free end of said support;

and a winch mechanism for raising and lowering said cargo receptacle longitudinally along said guideways.

2. The improved cargo transport system of claim 1 further characterized in that said elevator mechanism is provided with at least one upper telescoping element and a corresponding number of lower telescoping elements, and the uppermost of said upper elements is connected to the free end of said support and said cargo receptacle extends outwardly from said lower elements and said winch mechanism is operably connected to said cargo receptacle to move said cargo receptacle longitudinally with respect to said telescoping elements, and said winch mechanism is also operably connected to at least one of said lower telescoping elements to longitudinally move said lower telescoping elements relative to said upper telescoping elements.

3. The improved cargo transport system of claim 2 further characterized in that said upper elements are mounted on either side of said support and telescope into corresponding lower elements, and said lower elements include inwardly facing channels, forming dual parallel guideways and said cargo receptacle includes a shelf extending laterally out from said lower elements and rollers attached to said shelf ride within said guideways.

4. The improved cargo transport system of claim 3, wherein said shelf is comprised of a laterally extending receptacle conveyor, and means are provided for driving said powered endless conveyor means carried on said support and also for engaging said receptacle conveyor when said cargo receptacle is moved to said upper position and for disengaging said receptacle conveyor from said powered endless conveyor means when said cargo receptacle is moved from said upper position.

5. The improved cargo transport system of claim 4 further characterized in that said shelf is provided with a limit stop fixed in position at the lateral extremity thereof to prevent cargo loads from advancing beyond the lateral extremity of said shelf.

6. The improved cargo transport system of claim 3 wherein said shelf is comprised of a laterally extending receptacle conveyor and drive means is associated with said powered endless conveyor means carried on said framework, and an idler mechanism is engaged by said drive means and is frictionally engageable with said receptacle conveyor to drive the same, whereby a cargo load may be propelled by said powered endless conveyor system onto said receptacle conveyor and is carried by said receptacle conveyor to the lateral extremity of said shelf.

7. The improved cargo transport system of claim 2 wherein the uppermost of said upper elements are rigidly secured to said support in substantially perpendicular alignment therewith.

8. The improved cargo transport system of claim 1 wherein said support is rotatably mounted on a movable carriage which may be secured in position at said cargo terminal.

9. The improved cargo transport system of claim 8 in which said carriage is provided with a hydraulic actuator comprising a hydraulic cylinder having a piston reciprocal therein and a piston rod extending therefrom, and said hydraulic actuator is connected to and interposed between said carriage and said support, whereby said support is hydraulically assisted in rotation with respect to said cargo terminal.

* * * * *